(12) United States Patent
Sun et al.

(10) Patent No.: US 12,106,545 B2
(45) Date of Patent: Oct. 1, 2024

(54) TRAINING METHOD AND DEVICE FOR IMAGE IDENTIFYING MODEL, AND IMAGE IDENTIFYING METHOD

(71) Applicant: LEMON INC., Grand Cayman (KY)

(72) Inventors: Jingna Sun, Beijing (CN); Peibin Chen, Beijing (CN); Weihong Zeng, Beijing (CN); Xu Wang, Beijing (CN); Jing Liu, Los Angeles, CA (US); Chunpong Lai, Los Angeles, CA (US); Shen Sang, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 366 days.

(21) Appl. No.: 17/534,681

(22) Filed: Nov. 24, 2021

(65) Prior Publication Data
US 2023/0035131 A1 Feb. 2, 2023

(30) Foreign Application Priority Data

Jul. 29, 2021 (CN) .......................... 202110863490.8

(51) Int. Cl.
*G06V 10/764* (2022.01)
*G06N 3/08* (2023.01)
(Continued)

(52) U.S. Cl.
CPC ............. *G06V 10/764* (2022.01); *G06N 3/08* (2013.01); *G06V 10/72* (2022.01); *G06V 10/82* (2022.01)

(58) Field of Classification Search
CPC ...... G06V 10/764; G06V 10/72; G06V 10/82; G06V 40/161; G06N 3/08; G06N 3/0464; G06N 3/09
See application file for complete search history.

(56) References Cited

U.S. PATENT DOCUMENTS 6,751,354 B2 * 6/2004 Foote .................. G06V 10/764
382/209
2008/0114564 A1 5/2008 Ihara
(Continued)

FOREIGN PATENT DOCUMENTS

CN 110210321 A 9/2019
CN 112446428 A 3/2021
(Continued)

OTHER PUBLICATIONS

B. Moreno, A. Sanchez and J. F. Velez, "On the use of outer ear images for personal identification in security applications," Proceedings IEEE 33rd Annual 1999 International Carnahan Conference on Security Technology (Cat. No.99CH36303), Madrid, Spain, 1999, pp. 469-476, doi: 10.1109/CCST.1999.797956. (Year: 1999).*
(Continued)

*Primary Examiner* — Sumati Lefkowitz
*Assistant Examiner* — Aaron Joseph Sorrin
(74) *Attorney, Agent, or Firm* — Faegre Drinker Biddle & Reath LLP (57) ABSTRACT

The present disclosure provides a training method and device for an image identifying model, and an image identifying method. The training method comprises: obtaining image samples of a plurality of categories; inputting image samples of each category into a feature extraction layer of the image identifying model to extract a feature vector of each image sample; calculating a statistical characteristic information of an actual distribution function corresponding to each category according to the feature vector of each image sample of the each category; establishing an augmented distribution function corresponding to the each category according to the statistical characteristic information; obtaining augmented sample features of the each category based on the augmented distribution function; and (Continued)

inputting feature vectors of the image samples and the augmented sample features into a classification layer of the image identifying model for supervised learning.

18 Claims, 4 Drawing Sheets

(51) Int. Cl.
*G06V 10/72* (2022.01)
*G06V 10/82* (2022.01)

(56) References Cited

U.S. PATENT DOCUMENTS

| | | | |
|---|---|---|---|
| 2020/0250491 A1 | 8/2020 | Peng et al. | |
| 2021/0166066 A1* | 6/2021 | Ando | G06T 7/00 |
| 2022/0207425 A1* | 6/2022 | Nakae | A61B 5/055 |

FOREIGN PATENT DOCUMENTS

| | | | | |
|---|---|---|---|---|
| CN | 112733808 A | * | 4/2021 | G06K 9/00248 |
| CN | 113111803 A | | 7/2021 | |

OTHER PUBLICATIONS

Aaron Hertzmann, Charles E. Jacobs, Nuria Oliver, Brian Curless, and David H. Salesin. 2023. Image Analogies. Seminal Graphics Papers: Pushing the Boundaries, vol. 2 (1st ed.). Association for Computing Machinery, New York, NY, USA, Article 58, 557-570. https://doi.org/10.1145/3596711.3596770 (Year: 2001).*

C. -Y. Park, H. -G. Kim, D. -K. Lee, Z. Li, S. -H. Han and H. -J. Choi, "Image Analogy with Gaussian Process," 2018 IEEE International Conference on Big Data and Smart Computing (BigComp), Shanghai, China, 2018, pp. 522-525, doi: 10.1109/BigComp.2018.00086. (Year: 2018).*

CN-112733808-A—original and english translation (Year: 2021).*

International Search Report mailed Aug. 17, 2022 for PCT/SG2022/050281.

* cited by examiner

TRAINING METHOD AND DEVICE FOR IMAGE IDENTIFYING MODEL, AND IMAGE IDENTIFYING METHOD

CROSS-REFERENCE TO RELATED APPLICATIONS

The present disclosure is based on and claims priority to China Patent Application No. 202110863490.8 filed on Jul. 29, 2021, the disclosure of which is incorporated by reference herein in its entirety.

TECHNICAL FIELD

The present disclosure relates to a training method and device for an image identifying model, and an image identifying method.

BACKGROUND

During a model training stage in a field of image identification, there may be a problem of data imbalance, which means that number of samples in all categories of a data set are extremely unbalanced. This is an intricate problem to be solved, and widely distributed in real data collection. At present, there are mainly two solutions for resolving the problem of data imbalance, where one solution is to solve this problem from the data level, and the other is to solve this problem from the loss function level.

At the data level, the data is usually expanded by under-sampling, over-sampling, or data enhancement, in order to alleviate the learning problem of the model for the small-sample category (the number of samples in the category is relatively small). Under-sampling and over-sampling are to alleviate the problem of a poor identification rate of the small-sample category by changing the probability of samples to be sampled, so that samples of the small-sample category can be trained multiple times. Data enhancement is to expand the data of the small-sample category by adding noise to the samples of the small-sample category. The addition of noise comprises a plurality of types such as rotation, flip, or the like. These operations on the data may alleviate the problem of sample imbalance to a certain extent, but these simple operations may cause information loss or result in overfit of the model on the small-sample category.

At the level of the loss function, the loss of the small-sample category is usually punished by improving the loss function. By emphasized weighting of the loss of the small-sample category, it is possible to alleviate the identification problem of the small-sample category to a certain extent. However, since weighted parameters often need to be obtained based on experience or model training, a large number of experiments are often required to search for parameters on different tasks, and the same set of parameters cannot be generalized to all tasks.

SUMMARY

The summary of this invention is provided to introduce concepts in a brief form, which will be described in detail in the following detailed description. The summary of this invention is neither intended to identify the key features or essential features of the technical solution for which protection is sought, nor intended to be used to limit the scope of the technical solution for which protection is sought.

According to some embodiments of the present disclosure, a training method for an image identifying model is provided. The method comprises: obtaining image samples of a plurality of categories; inputting image samples of each category of the plurality of categories into a feature extraction layer of the image identifying model to extract a feature vector of each image sample; calculating a statistical characteristic information of an actual distribution function corresponding to each category according to the feature vector of each image sample of the each category; establishing an augmented distribution function corresponding to the each category according to the statistical characteristic information of the actual distribution function corresponding to the each category; obtaining augmented sample features of the each category based on the augmented distribution function corresponding to the each category; and inputting feature vectors of the image samples and the augmented sample features into a classification layer of the image identifying model for supervised learning.

According to other embodiments of the present disclosure, an image identifying method is provided. The method comprises: inputting an image to be identified into an image identifying model, wherein the image identifying model is trained by the training method described above; and identifying the image to be identified and outputting an image identifying result by the image identifying model.

According to other embodiments of the present disclosure, a training device for an image identifying model is provided. The device comprises: a first obtaining unit configured to obtain image samples of a plurality of categories; a feature extraction unit configured to input image samples of each category of the plurality of categories into a feature extraction layer of the image identifying model to extract a feature vector of each image sample; a calculating unit configured to calculate a statistical characteristic information of an actual distribution function corresponding to each category according to the feature vector of each image sample of the each category; an augmented distribution function establishing unit configured to establish an augmented distribution function corresponding to the each category according to the statistical characteristic information of the actual distribution function corresponding to the each category; a second obtaining unit configured to obtain augmented sample features of the each category based on the augmented distribution function corresponding to the each category; and a supervised learning unit configured to input feature vectors of the image samples and the augmented sample features into a classification layer of the image identifying model for supervised learning.

According to other embodiments of the present disclosure, an image identifying device is provided. The device comprises: an input unit configured to input an image to be identified into an image identifying model, wherein the image identifying model is trained by the training method described above; and an identification unit configured to identify the image to be identified and output an image identifying result by the image identifying model.

According to other embodiments of the present disclosure, an electronic device is provided. The device comprises: a memory; and a processor coupled to the memory, wherein the processor is configured to perform the method of any embodiment described in the present disclosure based on instructions stored in the memory.

According to other embodiments of the present disclosure, a non-transitory computer readable storage medium is provided. The computer readable storage medium has stored thereon computer program instructions which, when executed by a processor, implement the method of any embodiment described in the present disclosure.

Through the following detailed description of exemplary embodiments of the present disclosure with reference to the accompanying drawings, other features, aspects and advantages of the present disclosure will become apparent.

BRIEF DESCRIPTION OF THE DRAWINGS

Hereinafter, preferred embodiments of the present disclosure will be described with reference to the accompanying drawings. The accompanying drawings described herein are used to provide a further understanding of the present disclosure, and each of the accompanying drawings together with the following detailed description is comprised in this specification and forms a part of this specification to explain the present disclosure. It should be understood that, the accompanying drawings in the following description only relate to some embodiments of the present disclosure, but do not constitute a limitation to the present disclosure. In the accompanying drawings.

It should be understood that, for ease of description, the sizes of various parts shown in the accompanying drawings are not necessarily drawn according to actual proportional relationships. The same or similar reference numerals are used in various accompanying drawings to denote the same or similar components. Therefore, once an item is defined in one accompanying drawing, it might not be discussed further in subsequent accompanying drawings.

DETAILED DESCRIPTION

The technical solutions in the embodiments of the present disclosure will be explicitly and completely described below in conjunction with the accompanying drawings in the embodiments of the present disclosure. However, it is apparent that the described embodiments are only a part of the embodiments of the present disclosure, rather than all the embodiments. The following description of the embodiments is actually only illustrative, and by no means serves as any limitation to the present disclosure and its application or use. It should be understood that the present disclosure may be implemented in various forms, and should not be construed as being limited to the embodiments set forth herein.

It should be understood that the various steps recited in the method implementations of the present disclosure may be performed according to different sequences, and/or performed in parallel. In addition, the method implementations may comprise additional steps and/or omit to perform the illustrated steps. The scope of the present disclosure is not limited in this respect. Unless specifically stated otherwise, the relative arrangement of components and steps, the numerical expressions, and the values set forth in these embodiments should be construed as merely exemplary, but do not limit the scope of the present disclosure.

The term "comprising" and its variations used in the present disclosure represent an open term that comprises at least the following elements/features but does not exclude other elements/features, that is, "comprising but not limited to". In addition, the term "including" and its variations used in the present disclosure represent an open term that includes at least the following elements/features, but does not exclude other elements/features, that is, "including but not limited to". Therefore, comprising and including are synonymous. The term "based on" means "at least partially based on".

The term "one embodiment", "some embodiments" or "an embodiment" throughout the specification means that a specific feature, structure, or characteristic described in combination with the embodiment(s) is comprised in at least one embodiment of the present invention. For example, the term "one embodiment" means "at least one embodiment"; the term "another embodiment" means "at least one additional embodiment"; and the term "some embodiments" means "at least some embodiments". Moreover, the presences of the phrases "in one embodiment", "in some embodiments" or "in an embodiment" in various places throughout the specification do not necessarily all refer to the same embodiment, but may also refer to the same embodiment.

It should be noted that the concepts such as "first" and "second" mentioned in the present disclosure are only used to distinguish different devices, modules or units, but not used to limit the order or interdependence of functions performed by these devices, modules or units. Unless otherwise specified, the concepts such as "first" and "second" are not intended to imply that the objects thus described have to follow a given order in terms of time, space and ranking, or a given order in any other manner.

It should be noted that the modifications of "one" and "a plurality of" mentioned in the present disclosure are illustrative and not restrictive, and those skilled in the art should understand that unless clearly indicated in the context otherwise, they should be understood as "one or more".

The names of messages or information exchanged between multiple devices in the embodiments of the present disclosure are only used for illustrative purposes, but not for limiting the scope of these messages or information.

The embodiments of the present disclosure will be described in detail below in conjunction with the accompanying drawings, but the present disclosure is not limited to these specific embodiments. The following specific embodiments may be combined with each other, and the same or similar concepts or processes will not be described in detail in some embodiments. In addition, in one or more embodiments, specific features, structures, or characteristics may be combined by those of ordinary skill in the art in any suitable manner that will be apparent from the present disclosure.

It should be understood that the present disclosure also does not limit how to obtain the image to be applied/processed. In one embodiment of the present disclosure, it may be obtained from a storage device, such as an internal memory or an external storage device. In another embodiment of the present disclosure, it is possible to perform shooting by deploying a photographing assembly. It should be noted that the obtained image may be a captured image, or may be a frame of image in a captured video, but is not particularly limited thereto.

In the context of the present disclosure, an image may refer to any of a plurality of images, such as color images and grayscale images. It should be noted that in the context of this specification, the type of image is not specifically limited. In addition, the image may be any suitable image, for example an original image obtained by a camera device, or an image that has been subjected to specific processing on the original image, such as preliminary filtering, anti-aliasing, color adjustment, contrast adjustment and normalization. It should be noted that the pre-processing operation may also comprise other types of pre-processing operations known in the art, which will not be described in detail here.

One of the technical problems solved by the present disclosure is to increase the number of samples in the small-sample category, thereby improving the accuracy of model training.

In view of this, the present disclosure provides a training method for an image identifying model according to some embodiments of the present disclosure. The training method for the image identifying model will be described in detail below in conjunction with the accompanying drawings.

Figure 1:
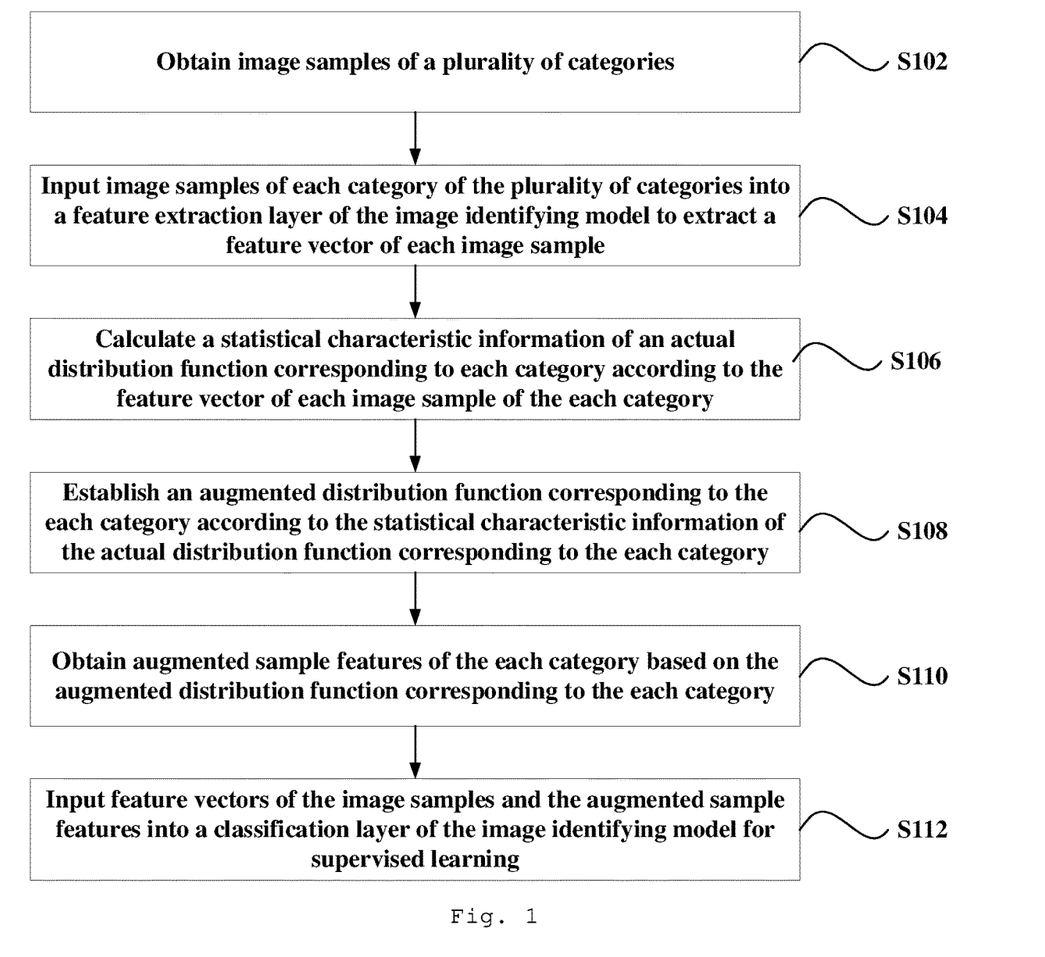
FIG. 1 is a flowchart showing a training method for an image identifying model according to some embodiments of the present disclosure.
Figure 7:
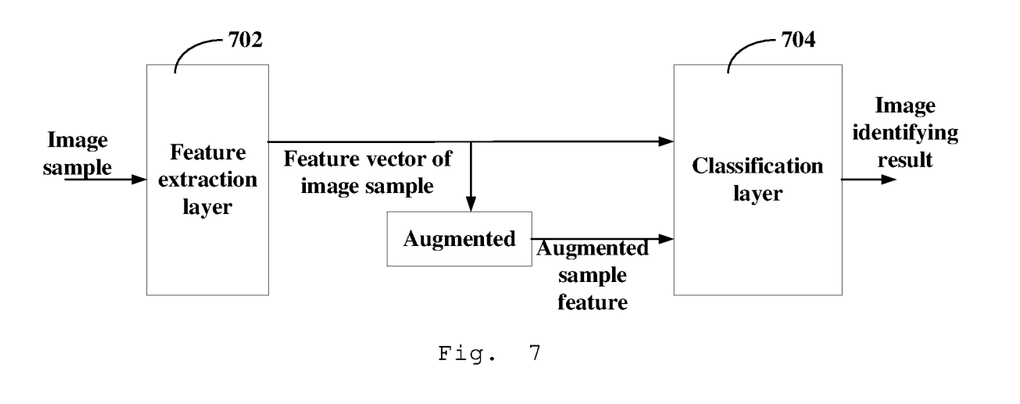
FIG. 7 is a schematic view showing a structure of an image identifying model according to some embodiments of the present disclosure.

FIG. 1 is a flowchart showing a training method for an image identifying model according to some embodiments of the present disclosure. The training method comprises steps S102 to S112. FIG. 7 is a schematic view showing a structure of an image identifying model according to some embodiments of the present disclosure. The training method will be described in detail below in conjunction with FIGS. 1 and 7.

As shown in FIG. 1, in step S102, image samples of a plurality of categories are obtained.

In some embodiments, the step S102 comprises: collecting image samples of the plurality of categories under a same attribute to obtain at least a portion of image samples of each category. For example, the numbers of image samples of all categories collected in the plurality of categories are substantially equal. That is, basic equalization sampling is performed for each category.

It should be noted that the phrase "substantially equal" here comprises, but is not limited to, absolute equal, and may be slightly unequal. For example, when a first category has 200 image samples, and a second category has 2000 image samples, if 150 samples are collected from 200 image samples in the first category, and 200 samples are collected from 2000 image samples in the second category, it may be considered that the number of samples collected from the first category is substantially equal to the number of samples collected from the second category. That is to say, in some embodiments, there may be a certain difference in the numbers of collected image samples of different categories, as long as this difference is within a predetermined range, or in other words, as long as this difference is within an acceptable range. Of course, those skilled in the art can understand that the examples of the number of samples here are only exemplary, but do not serve to limit the number of samples in the present disclosure.

In some embodiments, the collecting of the image samples of the plurality of categories under the same attribute comprises: collecting repeatedly at least part of image samples of a first category in the plurality of categories in a case where actual number of image samples in the first category is less than planned number of image samples collected from the first category.

For example, the first category in the plurality of categories has 200 image samples. When 300 image samples are planned to be collected from the first category, since the actual number of image samples in the first category is less than the planned number of image samples collected from the first category, after all the 200 image samples are collected, a part of the image samples in the 200 image samples (for example, 100 image samples in the 200 image samples) may be repeatedly sampled, so as to satisfy the planned number of 300 image samples.

In some embodiments, the collecting of the image samples of the plurality of categories under the same attribute comprises: collecting all image samples of a second category in the plurality of categories in a case where actual number of image samples in the second category is equal to planned number of image samples collected from the second category.

For example, the second category in the plurality of categories has 300 image samples. When 300 image samples are planned to be collected from the second category, since the actual number of image samples in the second category is exactly equal to the planned number of image samples collected from the second category, all image samples of the second category are collected.

In some embodiments, the collecting of the image samples of the plurality of categories under the same attribute comprises: collecting a part of image samples of a third category in the plurality of categories in a case where actual number of image samples in the third category is greater than planned number of image samples collected from the third category.

For example, the third category in the plurality of categories has 2000 image samples. When 300 image samples are planned to be collected from the third category, since the actual number of image samples in the third category is greater than the planned number of image samples collected from the third category, a part of image samples of the third category are collected. For example, 300 image samples may be randomly collected from 2000 image samples in the third category.

In some embodiments, the above-described image identifying model is used in the field of face identification. In this case, the above-described attribute represents a certain part of the face. For example, the attribute comprises an eye, an eyebrow, a nose, or the like. The above-described category is a shape category of the certain part of the face. For example, the eye may be divided into three categories: large, medium, and small; the eyebrow may be divided into three categories: thick, medium, and thin; the nose may be divided into three categories: high, medium, and low, and the like. The image sample comprises an image sample of the certain part of the face. For example, the image sample may comprise an image sample of an eye, an image sample of an eyebrow, or an image sample of a nose, and the like.

In step S104, image samples of each category of the plurality of categories are input into a feature extraction layer (for example, a feature extraction layer 702 shown in FIG. 7) of the image identifying model to extract a feature vector of each image sample.

That is, in this step, the image samples of each category obtained in step S102 are input into the image identifying model, and the feature vector of each image sample is extracted through the feature extraction layer of the image identifying model. For example, the image identifying model is a convolutional neural network.

In step S106, a statistical characteristic information of an actual distribution function corresponding to each category is calculated according to the feature vector of each image sample of the each category.

Here, for the image samples of each category collected in step S102, the feature vectors of these image samples may conform to a certain actual distribution function. For example, the actual distribution function is a Gaussian distribution function. By using a known calculation method, the statistical characteristic information of the actual distribution function can be obtained.

In some embodiments, the statistical characteristic information comprises a first statistical characteristic information and a second statistical characteristic information. For example, the first statistical characteristic information is a mean value of the actual distribution function, and the second statistical characteristic information is a variance or standard deviation of the actual distribution function.

For example, in a case where the actual distribution function is a Gaussian distribution function, the mean or variance (which may also be standard deviation) of the Gaussian distribution function corresponding to each category may be calculated. For example, if a certain attribute comprises N categories, where N is a positive integer, then the mean value $\mu_i$ and the variance $\sigma_i^2$ (or the standard deviation $\sigma_i$) corresponding to each category i ($1 \leq i \leq N$, and i is a positive integer) can be calculated.

In an embodiment of the present disclosure, the mean value of a certain category i represents the essential information of the category i, and the variance (or the standard deviation) of the category represents the diversity of samples within the category, but does not represent category information. Such diversity may be migrated.

The categories of a classification task under a single attribute are homogeneous. For example, the large, medium, and small sizes of eyes are all categories that represent the size of the eye. It may be considered that the distribution of each category under a single attribute is similar, and the focus is on the size of the eye.

In step S108, an augmented distribution function corresponding to the each category is established according to the statistical characteristic information of the actual distribution function corresponding to the each category. For example, a function type of the augmented distribution function is the same as a function type of the actual distribution function. For example, the actual distribution function and the augmented distribution function are Gaussian distribution functions.

In some embodiments, the step S108 comprises: calculating an average value of the second statistical characteristic information of actual distribution functions corresponding to the plurality of categories; and establishing the augmented distribution function corresponding to the each category in a case where the first statistical characteristic information of the each category and the average value of the second statistical characteristic information are used as statistical characteristic parameters.

For example, if the second statistical feature information is the variance, an average value $$\overline{\sigma^2} = \frac{\sum_{i=1}^{N} \sigma_i^2}{N}$$

of the variances of the Gaussian distribution function corresponding to N categories can be calculated (the average value of the variance can approximately represent the diversity of this attribute, which can be referred as a category average variance). Then, by taking the average value $\vec{\sigma^2}$ of the variance as a new variance of a certain category i, and a mean value $\mu_i$ of the category i as a mean value, a new Gaussian distribution function corresponding to the category i is established as an augmented distribution function of the category i.

For another example, if the second statistical feature information is the standard deviation, an average value $$\overline{\sigma} = \frac{\sum_{i=1}^{N} \sigma_i}{N}$$

of the standard deviations of the Gaussian distribution function corresponding to N categories can be calculated. Then, by taking the average value $\overline{\sigma}$ of the standard deviation as a new standard deviation of a certain category i, and a mean value $\mu_i$ of the category i as a mean value, a new Gaussian distribution function corresponding to the category i is established as an augmented distribution function of the category i.

In step S110, augmented sample features of the each category are obtained based on the augmented distribution function corresponding to the each category.

In some embodiments, the step S110 comprises: sampling the augmented distribution function corresponding to the each category to obtain the augmented sample features corresponding to the each category. Here, the augmented sample feature is the augmented sample feature vector.

In some embodiments, number of the image samples of each category is equal to number of the augmented sample features of the each category. For example, if 300 image samples are collected from each category during the process of performing step S102, then 300 samples are also collected from the augmented distribution function of each category during the process of performing step S110. In this way, during the subsequent training process, the identification of the multi-sample category may not be basically affected whilst improving the diversity and generalization ability of the small-sample category.

After the above steps, the augmented sample features are obtained through augmentation operations, as shown in FIG. 7.

In step S112, the feature vectors of the image samples and the augmented sample features are input into a classification layer (for example, a classification layer 704 shown in FIG. 7) of the image identifying model for supervised learning.

In some embodiments, the step S112 comprises: inputting the feature vector of the image sample and the augmented sample feature into the classification layer 704 of the image identifying model to output an image identifying result corresponding to the image sample and the augmented sample; calculating a loss function value according to the image identifying result and the difference between label values of the image sample and the augmented sample; and adjusting parameters of the image identifying model according to the loss function value.

The above-described steps can be repeatedly performed to satisfy training ending conditions. For example, the training ending conditions are that the training times threshold or the loss function value is less than a function threshold. That is, the training is ended when the number of training times reaches the training times threshold, or the training is ended when the loss function value is less than the function threshold after cyclic adjustment.

So far, a training method for an image identifying model according to some embodiments of the present disclosure is provided. The training method comprises: obtaining image samples of a plurality of categories; inputting image samples of each category of the plurality of categories into a feature extraction layer of the image identifying model to extract a feature vector of each image sample; calculating a statistical characteristic information of an actual distribution function corresponding to each category according to the feature vector of each image sample of the each category; establishing an augmented distribution function corresponding to the each category according to the statistical characteristic information of the actual distribution function corresponding to the each category; obtaining augmented sample features of the each category based on the augmented distribution function corresponding to the each category; and inputting feature vectors of the image samples and the augmented sample features into a classification layer of the image identifying model for supervised learning. The training method can increase the number of samples in the small-sample category, and alleviate the problem of sample imbalance, thereby improving the accuracy of model training.

In the above-described method, at the feature level, data augmentation is performed on the data of the small-sample category by the distribution prior of the multi-sample category, thereby optimizing the identification accuracy of the small-sample category. For the identification task under a single face attribute, the imbalance of the data is a problem that is commonly present. During the data collection process, it is almost impossible to collect data sets with strong data diversities and balanced categories. In some extreme cases, it is even possible to cause serious data imbalance, which results in serious model deviations during the training process so that it can hardly be used. For these small-sample categories, in the above-described method of the present disclosure, augmented samples are added to these small-sample categories to improve the identification accuracy of the small-sample categories and enhance the generalization ability of the small-sample categories. For the multi-sample categories, due to the diversity of own samples, in the data augmentation manner of the above-described method, the identification of the multi-sample categories may not be substantially affected whilst improving the diversity and generalization ability of the small-sample categories, thereby reducing the damage to the identification accuracy of the multi-sample categories.

Figure 2:
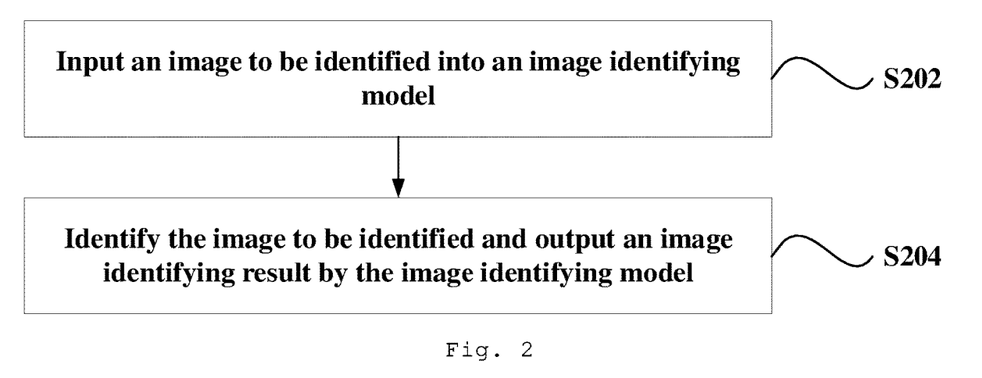
FIG. 2 is a flowchart showing an image identifying method according to some embodiments of the present disclosure.

FIG. 2 is a flowchart showing an image identifying method according to some embodiments of the present disclosure. As shown in FIG. 2, the image identifying method comprises steps S202 to S204.

In step S202, an image to be identified is input to an image identifying model. The image identifying model is trained by the aforementioned training method.

In step S204, the image to be identified is identified and an image identifying result is output by the image identifying model.

So far, an image identifying method according to some embodiments of the present disclosure is provided. Since the image identifying model used in the image identifying method has been trained by the aforementioned training method, the accuracy of image identification can be improved during the process of identifying the image to be identified by using the image identifying model.

Figure 3:
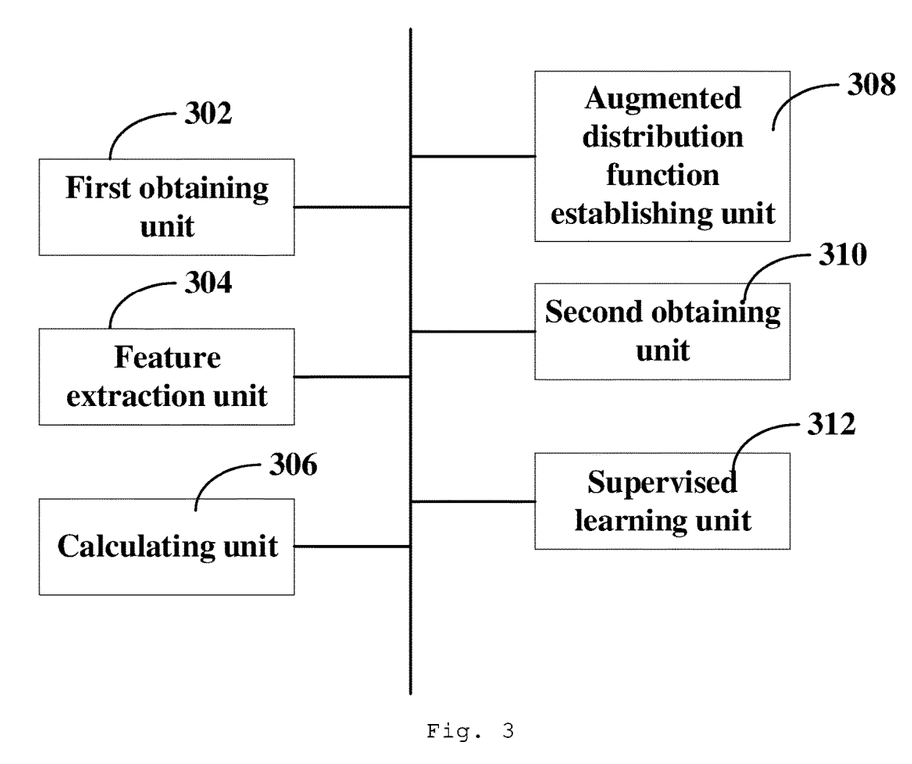
FIG. 3 is a schematic view showing a structure of a training device for an image identifying model according to some embodiments of the present disclosure.

FIG. 3 is a schematic view showing a structure of a training device for an image identifying model according to some embodiments of the present disclosure. As shown in FIG. 3, the training device comprises a first obtaining unit 302, a feature extraction unit 304, a calculating unit 306, an augmented distribution function establishing unit 308, a second obtaining unit 310, and a supervised learning unit 312.

The first obtaining unit 302 is configured to obtain image samples of a plurality of categories. For example, the first obtaining unit 302 is configured to collect image samples of the plurality of categories under the same attribute to obtain at least a portion of image samples of each category.

For example, the numbers of image samples of all categories collected in the plurality of categories are substantially equal.

In some embodiments, the first obtaining unit 302 is configured to collect repeatedly at least part of image samples of a first category in the plurality of categories in a case where actual number of image samples in the first category is less than planned number of image samples collected from the first category.

In other embodiments, the first obtaining unit 302 is further configured to collect all image samples of a second category in the plurality of categories in a case where actual number of image samples in the second category is equal to planned number of image samples collected from the second category.

In other embodiments, the first obtaining unit 302 is further configured to collect a part of image samples of a third category in the plurality of categories in a case where actual number of image samples in the third category is greater than planned number of image samples collected from the third category.

The feature extraction unit 304 is configured to input image samples of each category of the plurality of categories into a feature extraction layer of the image identifying model to extract a feature vector of each image sample.

The calculating unit 306 is configured to calculate a statistical characteristic information of an actual distribution function corresponding to each category according to the feature vector of each image sample of the each category.

In some embodiments, the statistical characteristic information comprises a first statistical characteristic information and a second statistical characteristic information. For example, the first statistical characteristic information is a mean value of the actual distribution function, and the second statistical characteristic information is a variance or standard deviation of the actual distribution function.

The augmented distribution function establishing unit 308 is configured to establish an augmented distribution function corresponding to the each category according to the statistical characteristic information of the actual distribution function corresponding to the each category. For example, a function type of the augmented distribution function is the same as a function type of the actual distribution function. For example, the actual distribution function and the augmented distribution function are Gaussian distribution functions.

In some embodiments, the augmented distribution function establishing unit 308 is configured to calculate an average value of the second statistical characteristic information of actual distribution functions corresponding to the plurality of categories, and establish the augmented distribution function corresponding to the each category in a case where the first statistical characteristic information of the each category and the average value of the second statistical characteristic information are used as statistical characteristic parameters.

The second obtaining unit 310 is configured to obtain augmented sample features of the each category based on the augmented distribution function corresponding to the each category. For example, the second obtaining unit 310 is configured to sample the augmented distribution function corresponding to the each category to obtain the augmented sample features corresponding to the each category.

In some embodiments, the number of the image samples of each category collected by the first obtaining unit 302 is equal to the number of the augmented sample features of the each category obtained by the second obtaining unit 310.

The supervised learning unit 312 is configured to input feature vectors of the image samples and the augmented sample features into a classification layer of the image identifying model for supervised learning.

In some embodiments, the supervised learning unit 312 is configured to input the feature vector of the image sample and the augmented sample feature into the classification layer of the image identifying model to output an image identifying result corresponding to the image sample and the augmented sample, calculate a loss function value according to the image identifying result and the difference between the label values of the image sample and the augmented sample, and adjust the parameters of the image identifying model according to the loss function value.

So far, a training device for an image identifying model according to some embodiments of the present disclosure is provided. The training device can increase the number of samples in the small-sample category, and alleviate the problem of sample imbalance, thereby improving the accuracy of model training.

Figure 4:
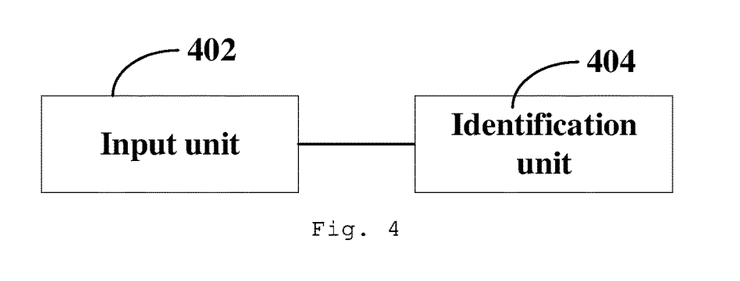
FIG. 4 is a schematic view showing a structure of an image identifying device according to some embodiments of the present disclosure.

FIG. 4 is a schematic view showing a structure of an image identifying device according to some embodiments of the present disclosure. As shown in FIG. 4, the image identifying device comprises an input unit 402 and an identification unit 404.

The input unit 402 is configured to input an image to be identified into an image identifying model. The image identifying model is trained by the aforementioned training method.

The identification unit 404 is configured to identify the image to be identified and output an image identifying result by the image identifying model.

So far, an image identifying device according to some embodiments of the present disclosure is provided. Since the image identifying model used in the image identifying device has been trained by the aforementioned training method, the accuracy of image identification can be improved during the process of identifying the image to be identified by using the image identifying model.

It should be noted that, the above-described units are only logical modules divided according to the specific functions implemented by the same, but not used to limit specific implementations. For example, they may be implemented in software, hardware, or a combination of software and hardware. In actual implementation, each of the above-described units may be implemented as an independent physical entity, or may also be implemented by a single entity (for example, a processor (CPU or DSP, and the like), an integrated circuit, etc.). In addition, the operations/functions implemented by the above-described units may be implemented by the processing circuit itself.

In addition, although not shown, the device may also comprise a memory, which may store various information generated by the device and various units comprised in the device during operation, programs and data for operation, data to be sent by the communication unit, or the like. The memory may be a volatile memory and/or a non-volatile memory. For example, the memory may comprise, but is not limited to, a random access memory (RAM), a dynamic random access memory (DRAM), a static random access memory (SRAM), a read only memory (ROM), or a flash memory. Of course, the memory may also be located outside the device. Alternatively, although not shown, the device may also comprise a communication unit, which may be used to communicate with other devices. In one example, the communication unit may be implemented in an appropriate manner known in the art, for example, comprising communication components such as antenna arrays and/or radio frequency links, various types of interfaces, communication units, and the like, which will not be described in detail here. In addition, the device may also comprise other components not shown, such as a radio frequency link, a baseband processing unit, a network interface, a processor, a controller, and the like, which will not be described in detail here.

Figure 5:
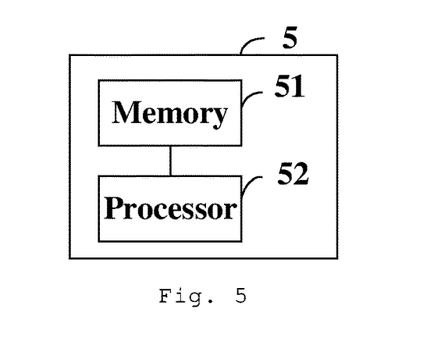
FIG. 5 is a schematic view showing a structure of an electronic device according to some embodiments of the present disclosure.

In some embodiments of the present disclosure, an electronic device is also provided. FIG. 5 is a schematic view showing a structure of an electronic device according to some embodiments of the present disclosure. For example, in some embodiments, the electronic device 5 which may be various types of devices, for example may comprise, but is not limited to mobile terminals such as mobile phones, notebook computers, digital broadcast receivers, PDAs (personal digital assistants), PADs (pad computers), PMP (Portable Multimedia Player) and in-vehicle terminals (for example, in-vehicle navigation terminals); and fixed terminals such as digital TVs, desktop computers and the like. For example, the electronic device 5 may comprise a display panel for displaying data and/or execution results used in the solution according to the present disclosure. For example, the display panel may have various shapes, such as a rectangular panel, an oval panel, or a polygonal panel. In addition, the display panel may be not only a flat panel, but also a curved panel, or even a spherical panel.

As shown in FIG. 5, the electronic device 5 of this embodiment comprises: a memory 51, and a processor 52 coupled to the memory 51. It should be noted that the components of the electronic device 5 shown in FIG. 5 are only exemplary, but not restrictive. According to actual application requirements, the electronic device 5 may also have other components. The processor 52 may control other components in the electronic device 5 to perform desired functions.

In some embodiments, the memory 51 is configured to store one or more computer-readable instructions. When the processor 52 is configured to run computer-readable instructions, the computer-readable instructions are executed by the processor 52 to implement the method according to any of the above-described embodiments. For the specific implementation of each step of the method and the related content as explained, it is possible to refer to the above-described embodiments, which will not be described in detail here.

For example, the processor 52 and the memory 51 may directly or indirectly communicate with each other. For example, the processor 52 and the memory 51 may communicate through a network. The network may comprise a wireless network, a wired network, and/or any combination of a wireless network and a wired network. The processor 52 and the memory 51 may also communicate with each other through a system bus, which is not limited in the present disclosure.

For example, the processor 52 may be embodied as various appropriate processors, processing devices and the like, such as a central processing unit (CPU), a graphics processing unit (GPU) or a network processor (NP); and may also be a digital signal processor (DSP), an application specific integrated circuit (ASIC), a field programmable gate array (FPGA) or other programmable logic devices, a discrete gate or transistor logic device, or a discrete hardware component. The central processing unit (CPU) may be X86 or ARM architecture and the like. For example, the memory 51 may comprise any combination of various forms of computer-readable storage media, such as a volatile memory and/or a non-volatile memory. The memory 51 may comprise, for example, a system memory. The system memory, for example, stores an operating system, an application program, a boot loader, a database, and other programs. Various application programs and various data may also be stored in the storage medium.

Figure 6:
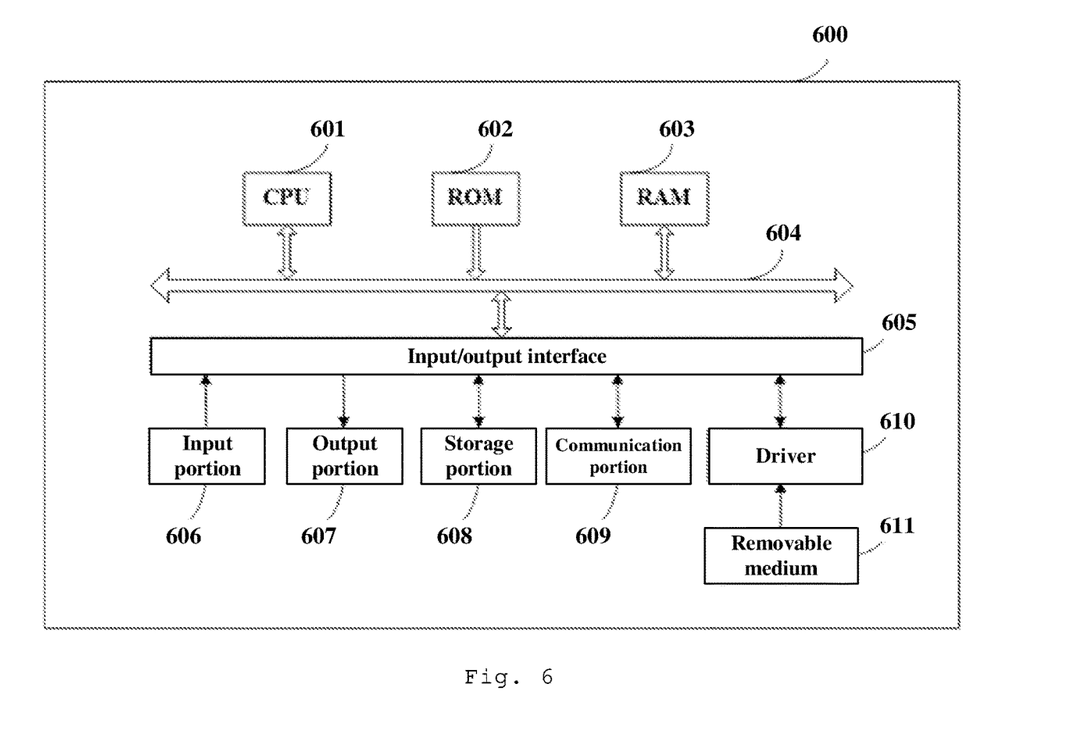
FIG. 6 is a schematic view showing a structure of an electronic device according to other embodiments of the present disclosure.

In addition, according to some embodiments of the present disclosure, in a case where various operations/processes according to the present disclosure are implemented by software and/or firmware, they may be implemented from a storage medium or a network to a computer system with a dedicated hardware structure. For example, the computer system 600 shown in FIG. 6 is installed with programs constituting the software. When the computer system is installed with various programs, it is possible to perform various functions, comprising the functions described above. FIG. 6 is a schematic view showing a structure of an electronic device according to other embodiments of the present disclosure.

In FIG. 6, a central processing unit (CPU) 601 executes various processes according to a program stored in a read only memory (ROM) 602 or a program loaded from a storage portion 608 to a random access memory (RAM) 603. In the RAM 603, data required when the CPU 601 executes various processes and the like is also stored as necessary. The central processing unit which is only exemplary, may also be other types of processors, such as the processors described above. The ROM 602, the RAM 603, and the storage portion 608 may be various forms of computer-readable storage media, as described below. It should be noted that although the ROM 602, the RAM 603, and the storage device 608 are shown in FIG. 6 respectively, one or more of them may be combined or located in the same or different memories or storage modules.

The CPU 601, the ROM 602, and the RAM 603 are connected to each other via a bus 604. The input/output interface 605 is also connected to the bus 604.

The following components are connected to the input/output interface 605: an input portion 606, such as a touch screen, a touch panel, a keyboard, a mouse, an image sensor, a microphone, an accelerometer or gyroscope; an output portion 607, comprising a display, such as a cathode ray tube (CRT), a liquid crystal display (LCD), a speaker, or a vibrator; a storage portion 608, comprising a hard disk, a tape, or the like; and a communication portion 609, comprising a network interface card such as a LAN card, a modem, or the like. The communication portion 609 allows execution of communication processing via a network such as Internet. It is easily conceivable that, although the devices or modules in the electronic device 600 shown in FIG. 6 communicate through the bus 604, they may also communicate through a network or other means, wherein the network may comprise a wireless network, a wired network, and/or any combination of a wireless network and a wired network.

The driver 610 is also connected to the input/output interface 605 as required. A removable medium 611 such as a magnetic disk, an optical disk, a magneto-optical disk or a semiconductor memory is mounted on the drive 610 as necessary, so that the computer program read out therefrom is installed into the storage portion 608 as necessary.

In a case of implementing the above-described series of processes by software, the program constituting a software may be installed from a network such as Internet or a storage medium such as a removable medium 611.

According to an embodiment of the present disclosure, the process described above with reference to the flowchart may be implemented as a computer software program. For example, in an embodiment of the present disclosure, there comprises a computer program product, which comprises a computer program carried on a computer-readable medium, wherein the computer program contains program codes for executing the method shown in the flowchart. In such embodiment, the computer program may be downloaded and installed from the network through the communication portion 609, installed from the storage portion 608, or installed from the ROM 602. When the computer program is executed by the CPU 601, the above-described functions defined in the method of the embodiment of the present disclosure are executed.

It should be noted that in the context of the present disclosure, a computer-readable medium may be a tangible medium, which may contain or store a program for use by the instruction execution system, apparatus, or device or use in combination with the instruction execution system, apparatus, or device. The computer-readable medium may be a computer-readable signal medium, a computer-readable storage medium or any combination thereof. The computer-readable storage medium may be, for example, but is not limited to: an electrical, magnetic, optical, electromagnetic, infrared, or semiconductor system, device, or apparatus, or a combination thereof. More specific examples of the computer-readable storage medium may comprise, but is not limited to: an electrical connection having one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium may be any tangible medium that contains or stores a program which may be used by an instruction execution system, apparatus, or device or used in combination therewith. In the present disclosure, the computer-readable signal medium may comprise a data signal propagated in a baseband or as a part of a carrier wave, wherein a computer-readable program code is carried. Such propagated data signal may take many forms, comprising but not limited to an electromagnetic signal, an optical signal, or any suitable combination thereof. The computer-readable signal medium may also be any computer-readable medium other than the computer-readable storage medium. The computer-readable signal medium may send, propagate, or transmit a program for use by an instruction execution system, apparatus, or device or in combination with therewith. The program code contained on the computer-readable medium may be transmitted by any suitable medium, comprising but not limited to: a wire, an optical cable, radio frequency (RF), and the like, or any suitable combination thereof.

The above-described computer-readable medium may be comprised in the above-described electronic device; or may also exist alone without being assembled into the electronic device.

In some embodiments, a computer program is also provided. The computer program comprises instructions, which, when executed by a processor, cause the processor to execute the method of any of the above-described embodiments. For example, the instructions may be embodied as a computer program code.

In an embodiment of the present disclosure, the computer program code for performing the operations of the present disclosure may be written in one or more programming languages or a combination thereof. The above-described programming languages comprise but are not limited to object-oriented programming languages, such as Java, Smalltalk, and C++, and also comprise conventional procedural programming languages, such as "C" language or similar programming languages. The program code may be executed entirely on the user's computer, partly on the user's computer, executed as an independent software package, partly on the user's computer and partly executed on a remote computer, or entirely executed on the remote computer or server. In a case of a remote computer, the remote computer may be connected to the user's computer through any kind of network (comprising a local area network (LAN) or a wide area network (WAN)), or may be connected to an external computer (for example, connected through Internet using an Internet service provider).

The flowcharts and block views in the accompanying drawings illustrate the possibly implemented architectures, functions, and operations of the system, method, and computer program product according to various embodiments of the present disclosure. In this regard, each block in the flowchart or block view may represent a module, a program segment, or a part of code, wherein the module, the program segment, or the part of code contains one or more executable instructions for realizing a specified logic function. It should also be noted that, in some alternative implementations, the functions marked in the block may also occur in a different order from the order marked in the accompanying drawings. For example, two blocks shown in succession which may actually be executed substantially in parallel, may sometimes also be executed in a reverse order, depending on the functions involved. It should also be noted that each block in the block view and/or flowchart, and a combination of the blocks in the block view and/or flowchart, may be implemented by a dedicated hardware-based system that performs the specified functions or operations, or may be implemented by a combination of dedicated hardware and computer instructions.

The modules, components, or units involved in the described embodiments of the present disclosure may be implemented in software or hardware. The names of the modules, components or units do not constitute a limitation on the modules, components or units themselves under certain circumstances.

The functions described hereinabove may be performed at least in part by one or more hardware logic components. For example, without limitation, the exemplary hardware logic components that may be used comprise: a Field Programmable Gate Array (FPGA), an Application Specific Integrated Circuit (ASIC), an Application Specific Standard Product (ASSP), a System on Chip (SOC), a Complex Programmable Logical device (CPLD) and the like.

According to some embodiments of the present disclosure, a training method for an image identifying model is provided. The method comprises: obtaining image samples of a plurality of categories; inputting image samples of each category of the plurality of categories into a feature extraction layer of the image identifying model to extract a feature vector of each image sample; calculating a statistical characteristic information of an actual distribution function corresponding to each category according to the feature vector of each image sample of the each category; establishing an augmented distribution function corresponding to the each category according to the statistical characteristic information of the actual distribution function corresponding to the each category; obtaining augmented sample features of the each category based on the augmented distribution function corresponding to the each category; and inputting feature vectors of the image samples and the augmented sample features into a classification layer of the image identifying model for supervised learning.

In some embodiments, the statistical characteristic information comprises a first statistical characteristic information and a second statistical characteristic information; and the establishing of the augmented distribution function corresponding to the each category comprises: calculating an average value of the second statistical characteristic information of actual distribution functions corresponding to the plurality of categories; and establishing the augmented distribution function corresponding to the each category in a case where the first statistical characteristic information of the each category and the average value of the second statistical characteristic information are used as statistical characteristic parameters.

In some embodiments, the first statistical characteristic information is a mean value of the actual distribution function, and the second statistical characteristic information is a variance or a standard deviation of the actual distribution function.

In some embodiments, the obtaining of the image samples of the plurality of categories comprises: collecting image samples of the plurality of categories under a same attribute to obtain at least a portion of image samples of each category.

In some embodiments, numbers of image samples of all categories collected in the plurality of categories are substantially equal.

In some embodiments, the collecting of the image samples of the plurality of categories under the same attribute comprises: collecting repeatedly at least part of image samples of a first category in the plurality of categories in a case where actual number of image samples in the first category is less than planned number of image samples collected from the first category.

In some embodiments, the collecting of the image samples of the plurality of categories under the same attribute comprises: collecting all image samples of a second category in the plurality of categories in a case where actual number of image samples in the second category is equal to planned number of image samples collected from the second category.

In some embodiments, the collecting of the image samples of the plurality of categories under the same attribute comprises: collecting a part of image samples of a third category in the plurality of categories in a case where actual number of image samples in the third category is greater than planned number of image samples collected from the third category.

In some embodiments, the obtaining of the augmented sample features of the each category based on the augmented distribution function corresponding to the each category comprises: sampling the augmented distribution function corresponding to the each category to obtain the augmented sample features corresponding to the each category.

In some embodiments, number of the image samples of the each category is equal to number of the augmented sample features of the each category.

In some embodiments, the actual distribution function and the augmented distribution function are Gaussian distribution functions.

In some embodiments, the attribute represents a certain part of a face; the category is a shape category of the certain part of the face; and the image sample comprises an image sample of the certain part of the face.

In some embodiments, a function type of the augmented distribution function is the same as a function type of the actual distribution function.

In some embodiments, the image identifying model is a convolutional neural network.

According to other embodiments of the present disclosure, an image identifying method is provided. The method comprises: inputting an image to be identified into an image identifying model, wherein the image identifying model is trained by the aforementioned training method; and identifying the image to be identified and outputting an image identifying result by the image identifying model.

According to other embodiments of the present disclosure, a training device for an image identifying model is provided. The training device comprises: a first obtaining unit configured to obtain image samples of a plurality of categories; a feature extraction unit configured to input image samples of each category of the plurality of categories into a feature extraction layer of the image identifying model to extract a feature vector of each image sample; a calculating unit configured to calculate a statistical characteristic information of an actual distribution function corresponding to each category according to the feature vector of each image sample of the each category; an augmented distribution function establishing unit configured to establish an augmented distribution function corresponding to the each category according to the statistical characteristic information of the actual distribution function corresponding to the each category; a second obtaining unit configured to obtain augmented sample features of the each category based on the augmented distribution function corresponding to the each category; and a supervised learning unit configured to input feature vectors of the image samples and the augmented sample features into a classification layer of the image identifying model for supervised learning.

According to other embodiments of the present disclosure, an image identifying device is provided. The image identifying device comprises: an input unit configured to input an image to be identified into an image identifying model, wherein the image identifying model is trained by the aforementioned training method; and an identification unit configured to identify the image to be identified and output an image identifying result by the image identifying model.

According to other embodiments of the present disclosure, an electronic device is provided. The electronic device comprises: a memory; and a processor coupled to the memory, wherein the processor is configured to perform the aforementioned method based on instructions stored in the memory.

According to other embodiments of the present disclosure, there is provided a non-transitory computer readable storage medium having stored thereon computer program instructions which, when executed by a processor, implement the aforementioned method.

According to still other embodiments of the present disclosure, a computer program is provided. The computer program comprises instructions, which, when executed by a processor, cause the processor to execute the method of any of the above-described embodiments the present disclosure.

According to some embodiments of the present disclosure, a computer program product is provided. The computer program product comprises instructions, which, when executed by a processor, implement the method of any of the above-described embodiments in the present disclosure.

The above-described description is only an explanation of some embodiments of the present disclosure and the applied technical principles. Those skilled in the art should understand that the scope of disclosure involved in this disclosure is not limited to the technical solutions formed by the specific combination of the above technical features, and at the same time should also cover other technical solutions formed by arbitrarily combining the above-described technical features or equivalent features without departing from the above disclosed concept. For example, the above-described features and the technical features disclosed in the present disclosure (but not limited thereto) having similar functions are replaced with each other to form a technical solution.

In the description provided herein, many specific details are elaborated. However, it is understood that the embodiments of the present invention may be implemented without these specific details. In other cases, in order not to obscure the understanding of the description, the well-known methods, structures and technologies are not demonstrated in detail.

In addition, although the operations are depicted in a specific order, this should not be understood as requiring these operations to be performed in the specific order shown or performed in a sequential order. Under certain circumstances, multitasking and parallel processing might be advantageous. Likewise, although several specific implementation details are contained in the above discussion, these should not be construed as limiting the scope of the present disclosure. Certain features that are described in the context of individual embodiments may also be implemented in combination in a single embodiment. Conversely, various features described in the context of a single embodiment may also be implemented in multiple embodiments individually or in any suitable sub-combination.

Although some specific embodiments of the present disclosure have been described in detail by way of examples, those skilled in the art should understand that the above examples are only for the purpose of illustration but not for limiting the scope of the present disclosure. It should be understood by those skilled in the art that modifications to the above embodiments may be made without departing from the scope and spirit of the present disclosure. The scope of the present disclosure is defined by the appended claims.

What is claimed is:

1. A training method for an image identifying model, comprising:
   obtaining image samples of a plurality of categories;
   inputting image samples of each category of the plurality of categories into a feature extraction layer of the image identifying model to extract a feature vector of each image sample;

calculating a statistical characteristic information of an actual distribution function corresponding to each category according to the feature vector of each image sample of the each category;

establishing an augmented distribution function corresponding to the each category according to the statistical characteristic information of the actual distribution function corresponding to the each category;

obtaining augmented sample features of the each category based on the augmented distribution function corresponding to the each category; and inputting feature vectors of the image samples and the augmented sample features into a classification layer of the image identifying model for supervised learning, wherein the statistical characteristic information comprises a first statistical characteristic information and a second statistical characteristic information; and the establishing of the augmented distribution function corresponding to the each category comprises:

calculating an average value of the second statistical characteristic information of actual distribution functions corresponding to the plurality of categories; and establishing the augmented distribution function corresponding to the each category in a case where the first statistical characteristic information of the each category and the average value of the second statistical characteristic information are used as statistical characteristic parameters.

2. The training method according to claim 1, wherein the first statistical characteristic information is a mean value of the actual distribution function, and the second statistical characteristic information is a variance or a standard deviation of the actual distribution function.

3. The training method according to claim 1, wherein the obtaining of the image samples of the plurality of categories comprises:

collecting image samples of the plurality of categories under a same attribute to obtain at least a portion of image samples of each category.

4. The training method according to claim 3, wherein numbers of image samples of all categories collected in the plurality of categories are equal.

5. The training method according to claim 3, wherein the collecting of the image samples of the plurality of categories under the same attribute comprises:

collecting repeatedly at least part of image samples of a first category in the plurality of categories in a case where an actual number of image samples in the first category is less than a planned number of image samples collected from the first category.

6. The training method according to claim 3, wherein the collecting of the image samples of the plurality of categories under the same attribute comprises:

collecting all image samples of a second category in the plurality of categories in a case where an actual number of image samples in the second category is equal to a planned number of image samples collected from the second category.

7. The training method according to claim 3, wherein the collecting of the image samples of the plurality of categories under the same attribute comprises:

collecting a part of image samples of a third category in the plurality of categories in a case where an actual number of image samples in the third category is greater than a planned number of image samples collected from the third category.

8. The training method according to claim 1, wherein the obtaining of the augmented sample features of the each category based on the augmented distribution function corresponding to the each category comprises:

sampling the augmented distribution function corresponding to the each category to obtain the augmented sample features corresponding to the each category.

9. The training method according to claim 8, wherein a number of the image samples of the each category is equal to a number of the augmented sample features of the each category.

10. The training method according to claim 1, wherein the actual distribution function and the augmented distribution function are Gaussian distribution functions.

11. The training method according to claim 3, wherein:
the attribute represents a certain part of a face;
the category is a shape category of the certain part of the face; and
the image sample comprises an image sample of the certain part of the face.

12. The training method according to claim 1, wherein a function type of the augmented distribution function is the same as a function type of the actual distribution function.

13. The training method according to claim 1, wherein the image identifying model is a convolutional neural network.

14. An image identifying method, comprising:
inputting an image to be identified into an image identifying model, wherein the image identifying model is trained by the training method according to claim 1; and
identifying the image to be identified and outputting an image identifying result by the image identifying model.

15. A training device for an image identifying model, comprising:
a first obtaining unit configured to obtain image samples of a plurality of categories;
a feature extraction unit configured to input image samples of each category of the plurality of categories into a feature extraction layer of the image identifying model to extract a feature vector of each image sample;
a calculating unit configured to calculate a statistical characteristic information of an actual distribution function corresponding to each category according to the feature vector of each image sample of the each category;
an augmented distribution function establishing unit configured to establish an augmented distribution function corresponding to the each category according to the statistical characteristic information of the actual distribution function corresponding to the each category;
a second obtaining unit configured to obtain augmented sample features of the each category based on the augmented distribution function corresponding to the each category; and
a supervised learning unit configured to input feature vectors of the image samples and the augmented sample features into a classification layer of the image identifying model for supervised learning,
wherein the statistical characteristic information comprises a first statistical characteristic information and a second statistical characteristic information; and
the augmented distribution function establishing unit is configured to calculate an average value of the second statistical characteristic information of actual distribution functions corresponding to the plurality of categories, and establish the augmented distribution function corresponding to the each category in a case where the first statistical characteristic information of the each category and the average value of the second statistical characteristic information are used as statistical characteristic parameters.

16. An image identifying device, comprising:
an input unit configured to input an image to be identified into an image identifying model, wherein the image identifying model is trained by the training method according to claim 1; and
an identification unit configured to identify the image to be identified and output an image identifying result by the image identifying model.

17. An electronic device, comprising:
a memory; and
a processor coupled to the memory, wherein the processor is configured to perform the method according to claim 1 based on instructions stored in the memory.

18. A non-transitory computer readable storage medium having stored thereon computer program instructions which, when executed by a processor, implement the method according to claim 1.

* * * * *